(12) United States Patent
Khan et al.

(10) Patent No.: US 8,553,624 B2
(45) Date of Patent: Oct. 8, 2013

(54) ASYNCHRONOUS HYBRID ARQ PROCESS INDICATION IN A MIMO WIRELESS COMMUNICATION SYSTEM

(75) Inventors: Farooq Khan, Allen, TX (US); Zhouyue Pi, Richardson, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 1265 days.

(21) Appl. No.: 12/222,113

(22) Filed: Aug. 1, 2008

(65) Prior Publication Data

US 2009/0098876 A1    Apr. 16, 2009

Related U.S. Application Data

(60) Provisional application No. 60/960,709, filed on Oct. 10, 2007.

(51) Int. Cl.
*H04W 4/00* (2009.01)

(52) U.S. Cl.
USPC .......................................... 370/329; 370/465

(58) Field of Classification Search
USPC ................. 370/328–329, 335, 341–342, 437, 370/441, 479, 230, 230.1, 231, 235, 465
See application file for complete search history.

(56) References Cited

U.S. PATENT DOCUMENTS

| | | | |
|---|---|---|---|
| 6,581,175 B1 | 6/2003 | Crump et al. | |
| 7,206,280 B1 | 4/2007 | Khan et al. | |
| 7,283,508 B2 * | 10/2007 | Choi et al. | 370/341 |
| 7,382,747 B2 * | 6/2008 | Hu et al. | 370/329 |
| 7,403,513 B2 * | 7/2008 | Lee et al. | 370/342 |
| 7,835,337 B2 * | 11/2010 | Kim et al. | 370/342 |
| 7,940,735 B2 * | 5/2011 | Kozisek et al. | 370/338 |
| 8,363,624 B2 * | 1/2013 | Blanz et al. | 370/335 |
| 2002/0054578 A1 * | 5/2002 | Zhang et al. | 370/328 |
| 2003/0174669 A1 | 9/2003 | Roh et al. | |
| 2005/0020313 A1 | 1/2005 | Chae et al. | |

(Continued)

FOREIGN PATENT DOCUMENTS

| | | |
|---|---|---|
| EP | 1 156 617 B1 | 9/2003 |
| EP | 1 838 029 A2 | 9/2007 |

(Continued)

OTHER PUBLICATIONS

Notification of Transmittal of the International Search Report and the Written Opinion of the International Searching Authority, or the Declaration dated Mar. 26, 2009 in connection with PCT Application No. PCT/KR2008/005941.

(Continued)

*Primary Examiner* — Kevin Mew

(57) ABSTRACT

Methods and apparatus for transmitting Asynchronous Hybrid Automatic Repeat reQuest (ARQ) process identities in a wireless communication system. A linking scheme is established between at least two sets of process identities of two respective corresponding codewords. When a first process identity is selected from among a first set of process identities of a first codeword, a second process identity may be derived in dependence upon the first process identity and the established linking scheme. Finally, a first packet from the first codeword is transmitted using a first transmission channel indicated by the first process identity, and a second packet is transmitted from the second codeword using a second transmission channel indicated by the second process identity. In addition, a control message including only the first process identity is transmitted.

14 Claims, 20 Drawing Sheets

(56) References Cited

U.S. PATENT DOCUMENTS

| | | |
|---|---|---|
| 2007/0011550 A1 | 1/2007 | Agrawal et al. |
| 2007/0023405 A1 | 2/2007 | Diem |
| 2008/0101369 A1* | 5/2008 | Sandoz et al. ............... 370/392 |
| 2008/0253336 A1* | 10/2008 | Parkvall et al. ............. 370/335 |
| 2008/0304463 A1* | 12/2008 | Borkar et al. ............... 370/342 |
| 2008/0304464 A1* | 12/2008 | Borkar et al. ............... 370/342 |
| 2009/0022087 A1* | 1/2009 | Dankberg et al. ........... 370/316 |
| 2010/0031110 A1* | 2/2010 | Seok et al. .................. 714/748 |
| 2010/0061345 A1* | 3/2010 | Wengerter et al. ........... 370/335 |
| 2010/0195594 A1* | 8/2010 | Seo et al. .................... 370/329 |
| 2010/0195624 A1* | 8/2010 | Zhang et al. ................ 370/335 |
| 2011/0085507 A1* | 4/2011 | Jongren ....................... 370/329 |
| 2012/0224544 A1* | 9/2012 | Khan et al. .................. 370/329 |

FOREIGN PATENT DOCUMENTS

| | | |
|---|---|---|
| RU | 2272357 C2 | 3/2006 |
| RU | 2 287 220 C2 | 11/2006 |
| RU | 2305898 C2 | 9/2007 |
| WO | WO 2007/052941 A1 | 5/2007 |
| WO | WO 2007/092258 A1 | 8/2007 |

OTHER PUBLICATIONS

Decision on Grant dated Feb. 1, 2011 in connection with Russian Patent Application No. 2010114252/09.
Office Action dated Oct. 4, 2012 in connection with U.S. Appl. No. 13/411,277, 14 pages.
Japanese Office Action dated Apr. 23, 2013 in connection with Japanese Patent Application No. JP2010-528807, 4 pages.
3GPP TSG-RAN WG1 #48; "HS-SCCH part 2 for UTRA MIMO"; R1-071081; St Louis, MO, Feb. 12-16, 2007; 2 pages.
TSG-RAN WG2 Meeting#56; "MIMO impacts on MAC in HSPA"; R2-063211; Riga, Latvia, Nov. 6-10, 2006; 3 pages.
3GPP TSG RAN WG2 Meeting #56bis; "HARQ process handling for Rel-7 FDD MIMO"; R2-070289; Sorrento, Italy, Jan. 15-19, 2007; 3 pages.

* cited by examiner

FIG. 5

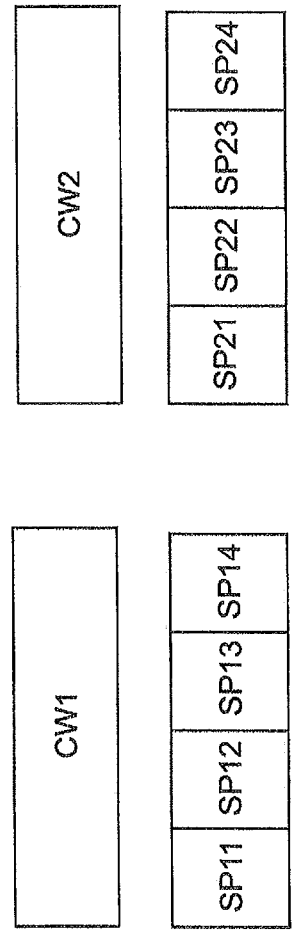

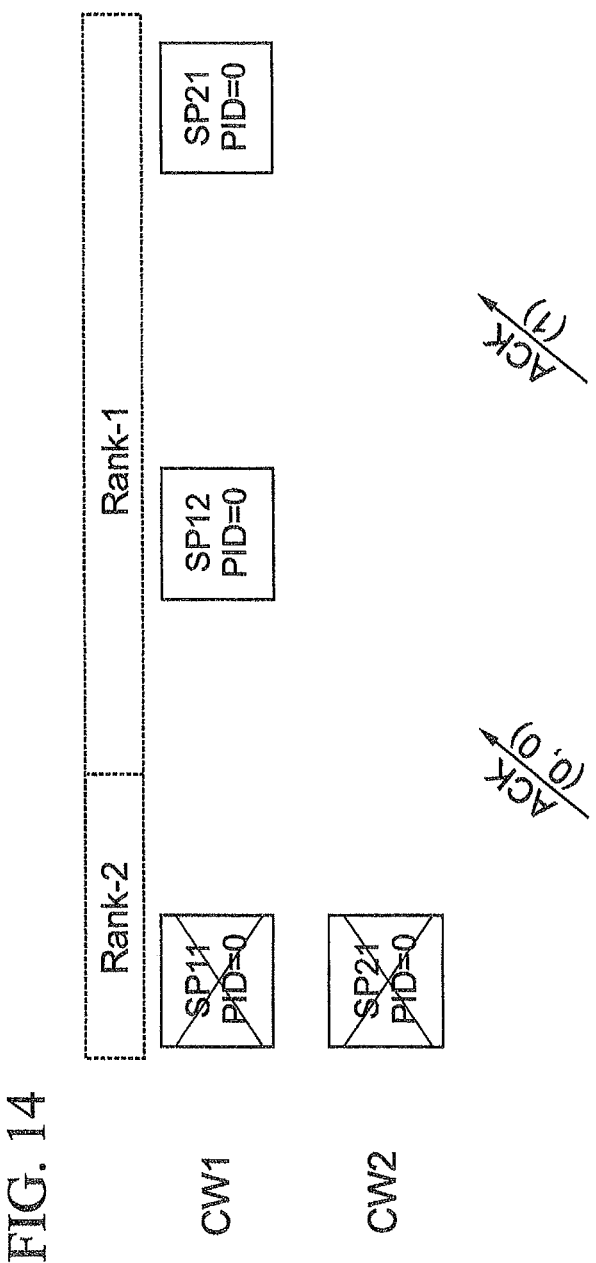

ASYNCHRONOUS HYBRID ARQ PROCESS INDICATION IN A MIMO WIRELESS COMMUNICATION SYSTEM

CLAIM OF PRIORITY

This application makes reference to, incorporates the same herein, and claims all benefits accruing under 35 U.S.C. §119 from a provisional application earlier filed in the U.S. Patent & Trademark Office on 10 Oct. 2007 and there duly assigned Ser. No. 60/960,709.

BACKGROUND OF THE INVENTION

1. Field of the Invention

The present invention relates to methods and apparatus for transmitting Asynchronous Hybrid Automatic Repeat request (ARQ) process identities in a wireless communication system.

2. Description of the Related Art

During data transmission, especially wireless data transmission, error inevitably occurs to decrease the quality of the transmitted data. Therefore, the data is retransmitted in order to correct the error.

Automatic Repeat-reQuest (ARQ) is an error control method for data transmission which makes use of acknowledgments and timeouts to achieve reliable data transmission. An acknowledgment is a message sent by the receiver to the transmitter to indicate that it has correctly received a data frame.

Usually, when the transmitter does not receive the acknowledgment before the timeout occurs (i.e. within a reasonable amount of time after sending the data frame), the transmitter retransmits the frame until the data within the frame is either correctly received or the error persists beyond a predetermined number of re-transmissions.

Hybrid ARQ (HARQ), is a variation of the ARQ error control method, which gives better performance than the ordinary ARQ scheme, particularly over wireless channels, at the cost of increased implementation complexity. One version HARQ is described in the IEEE 802.16e standard.

The HARQ protocol can be further classified into a synchronous HARQ protocol and an asynchronous HARQ protocol. In the synchronous HARQ protocol, the retransmissions happen at fixed time intervals and control information only needs to be transmitted along with a first subpacket transmission. The drawback of synchronous HARQ is that, however, the retransmission subpackets cannot be scheduled at preferable channel conditions because the timing of the retransmission is predetermined. Also, the modulation, coding and resource format cannot be adapted at the time of retransmission according to the prevailing channel conditions at the time of retransmission.

In the asynchronous HARQ protocol, the retransmission timing, modulation, coding and resource format can be adapted according to the prevailing channel and resource conditions at the time of retransmission. The control information, however, needs to be sent along with all the subpackets. The control information transmission along with each subpacket allows adjusting the transmission timing, modulation, coding and resources allocated.

In the third Generation Partnership Project (3GPP) Long Term Evolution (LTE) systems, a maximum of two codewords are used for transmission of two, three or four MIMO layers. In addition, an HARQ process identity is used to indicate the ID of the channel in an N-channel HARQ system. For example, a 3-bit process ID allows simultaneous operation on 8 SAW channels.

When two subpackets from two respectively corresponding codewords are transmitted using the HARQ transmission scheme, the transmission rank may change from 2 to 1 at time of retransmission. If both subpacket used a process ID of 0 (PID=0) at the first transmission in rank-2, only a single codeword can be retransmitted in rank-1. This is because a single subpacket under a single PID can be retransmitted in rank-1. The second codeword transmission has to start from the beginning at a later time. This results in loss of the previously transmitted subpacket in rank-2.

When two subpackets from two respectively corresponding codewords are transmitted using the HARQ transmission scheme, the transmission rank may also change from 1 to 2 at time of retransmission. If a first subpacket uses a process ID of 0, while a second subpacket uses a process ID of 1 at the first transmission in rank-1, the two codewords are transmitted in rank-1 in two subframes because a single codeword can be transmitted in rank-1 in a given subframe. We note that the retransmissions for the two codewords can be performed in rank-2 because the two codewords are transmitted on different hybrid ARQ processes.

SUMMARY OF THE INVENTION

It is therefore an object of the present invention to provide an improved method and apparatus for wireless communication.

It is another object of the present invention to provide an improved method and apparatus for efficiently transmitting Hybrid Automatic Repeat-reQuest (HARQ) process identities.

According to one aspect of the present invention, a linking scheme is established between at least two sets of process identities of two respective corresponding codewords. When a first process identity is selected from among a first set of process identities of a first codeword, a second process identity may be derived in dependence upon the first process identity and the established linking scheme. Finally, a first packet from the first codeword is transmitted using a first transmission channel indicated by the first process identity, and a second packet is transmitted from the second codeword using a second transmission channel indicated by the second process identity. In addition, a control message including only the first process identity is transmitted.

The control message may also include a codeword to layer mapping field indicating the mapping for the codewords to transmission layers.

The first packet and the second packet may be transmitted on different frequency subbands.

According to another aspect of the present invention, a linking scheme is established between a certain set of process identity fields and at least two sets of process identities of two respective corresponding codewords. When a process identity field is selected from among the certain set of process identity fields, a first process identity and a second process identity may be derived in dependence upon the selected process identity field and the established linking scheme. Finally, a first packet from the first codeword is transmitted using a first transmission channel indicated by the first process identity, and a second packet is transmitted from the second codeword using a second transmission channel indicated by the second process identity. In addition, a control message including the selected process identity field is transmitted.

According to still another aspect of the present invention, a linking scheme is established between a certain set of process identity fields, a certain set of differential process identities, and at least two sets of process identities of two respective corresponding codewords. Therefore, when a process identity field is selected from among the certain set of process identity fields, and a differential process identity is selected from among the certain set of differential process identities, a first process identity and a second process identity may be derived in dependence upon the selected process identity field, the selected differential process identity and the established linking scheme. Finally, a first packet from the first codeword is transmitted using a first transmission channel indicated by the first process identity, and a second packet is transmitted from the second codeword using a second transmission channel indicated by the second process identity. In addition, a control message including the selected process identity field and the selected differential process identity is transmitted.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 5 schematically illustrates an asynchronous Hybrid ARQ scheme;

FIG. 12 schematically illustrates an 8-channel Asynchronous Hybrid ARQ scheme;

FIG. 13 schematically illustrates an example of subpackets from two codewords;

FIG. 14 schematically illustrates an example of HARQ retransmission when rank changes from 2 to 1 at the time of retransmissions;

DETAILED DESCRIPTION OF THE INVENTION

Figure 1:
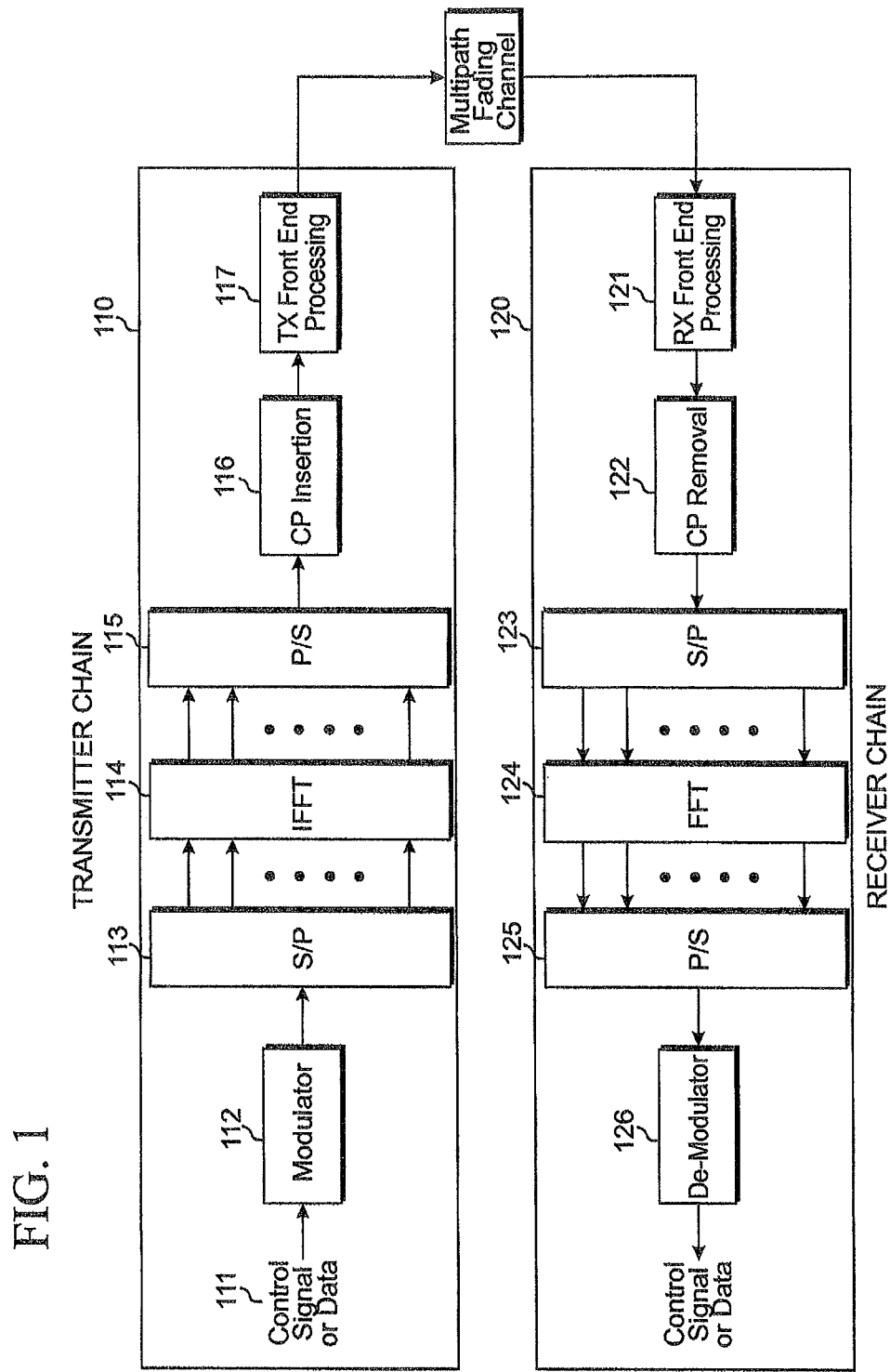
FIG. 1 schematically illustrates an Orthogonal Frequency Division Multiplexing (OFDM) transceiver chain.
Figure 2:
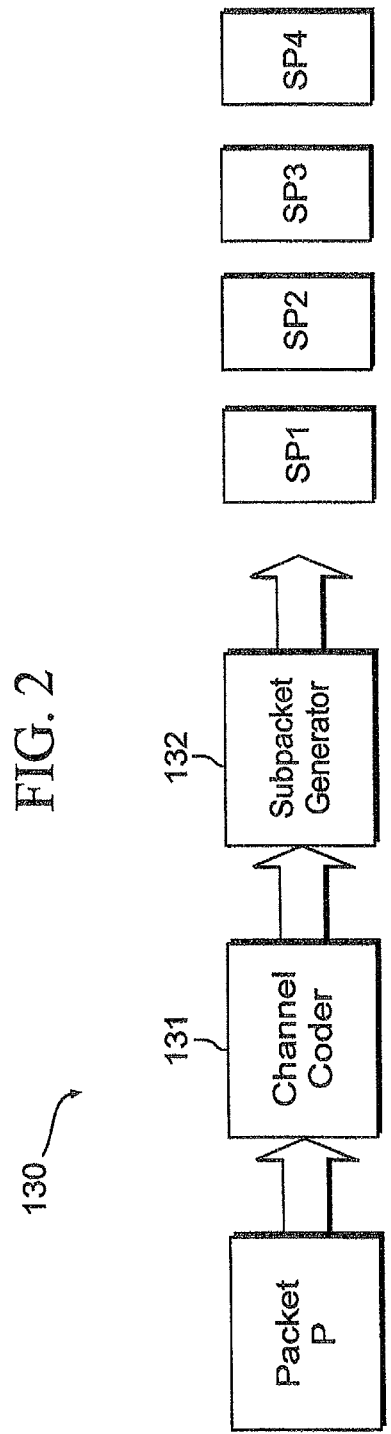
FIG. 2 schematically illustrates a scheme for generating subpackets.

FIG. 1 illustrates an Orthogonal Frequency Division Multiplexing (OFDM) transceiver chain. In a communication system using OFDM technology, at transmitter chain 110, control signals or data 111 is modulated by modulator 112 and is serial-to-parallel converted by Serial/Parallel (S/P) converter 113. Inverse Fast Fourier Transform (IFFT) unit 114 is used to transfer the signal from frequency domain to time domain. Cyclic prefix (CP) or zero prefix (ZP) is added to each OFDM symbol by CP insertion unit 116 to avoid or mitigate the impact due to multipath fading. Consequently, the signal is transmitted by transmitter (Tx) front end processing unit 117, such as an antenna (not shown), or alternatively, by fixed wire or cable. At receiver chain 120, assuming perfect time and frequency synchronization are achieved, the signal received by receiver (Rx) front end processing unit 121 is processed by CP removal unit 122. Fast Fourier Transform (FFT) unit 124 transfers the received signal from time domain to frequency domain for further processing.

The total bandwidth in an OFDM system is divided into narrowband frequency units called subcarriers. The number of subcarriers is equal to the FFT/IFFT size N used in the system. In general, the number of subcarriers used for data is less than N because some subcarriers at the edge of the frequency spectrum are reserved as guard subcarriers. In general, no information is transmitted on guard subcarriers.

Figure 4:
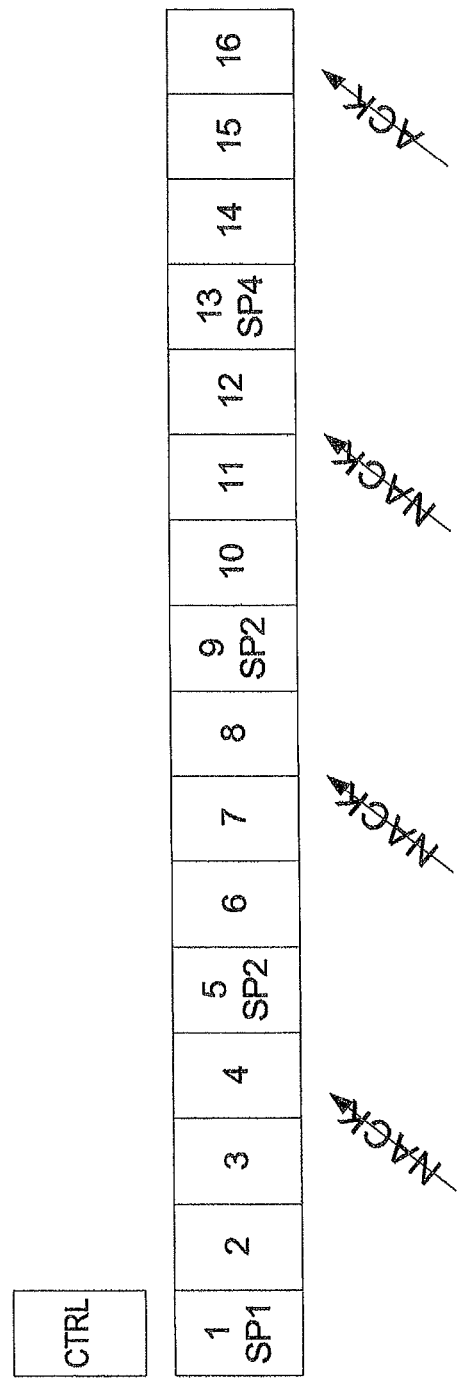
FIG. 4 schematically illustrates a synchronous Hybrid ARQ scheme.
Figure 5:
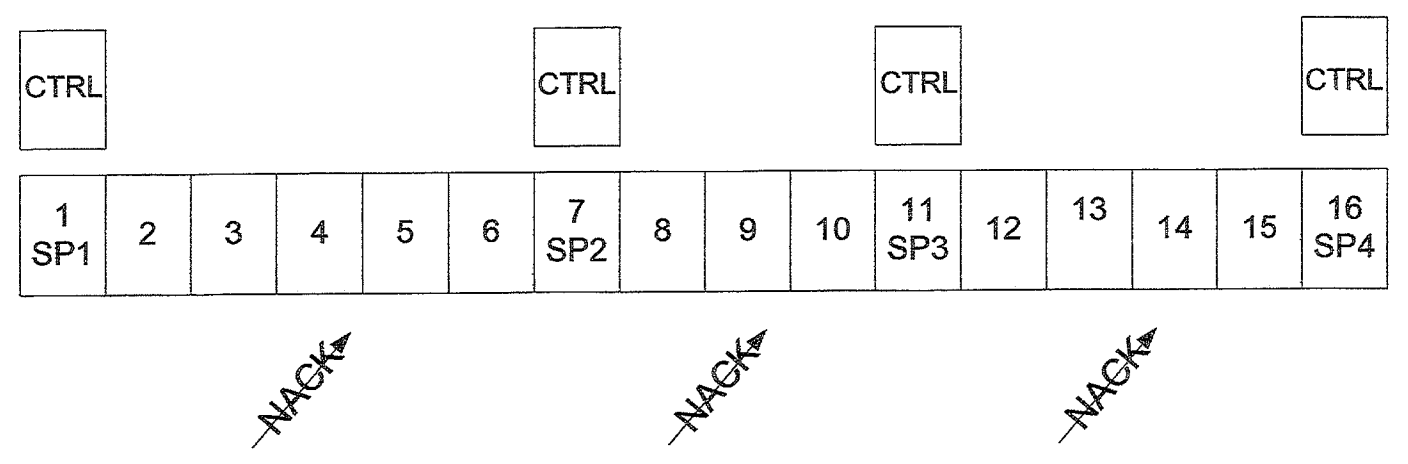

Hybrid Automatic Repeat request (ARQ) is a retransmission scheme whereby a transmitter sends redundant coded information (i.e., subpackets) in small increments. As shown in FIG. 5, in transmitter 130, an information packet P is first input into channel coder 131 to perform channel coding. The resulted coded bit stream is input into subpacket generator 132 to break into smaller units, i.e., subpackets SP1, SP2, SP3 and SP4. The hybrid ARQ retransmissions can either contain redundant symbols or coded bits which are different than the previous transmission(s) or copies of the same symbols or coded bits. The scheme which retransmits copies of the same information is referred to as chase combining. In case of Chase combining, the subpackets SP1, SP2, SP3 and SP4 as shown in FIG. 4 are all identical. The scheme where retransmitted symbols or coded bits are different than the previous transmission is generally referred to as an incremental redundancy scheme.

Figure 3:
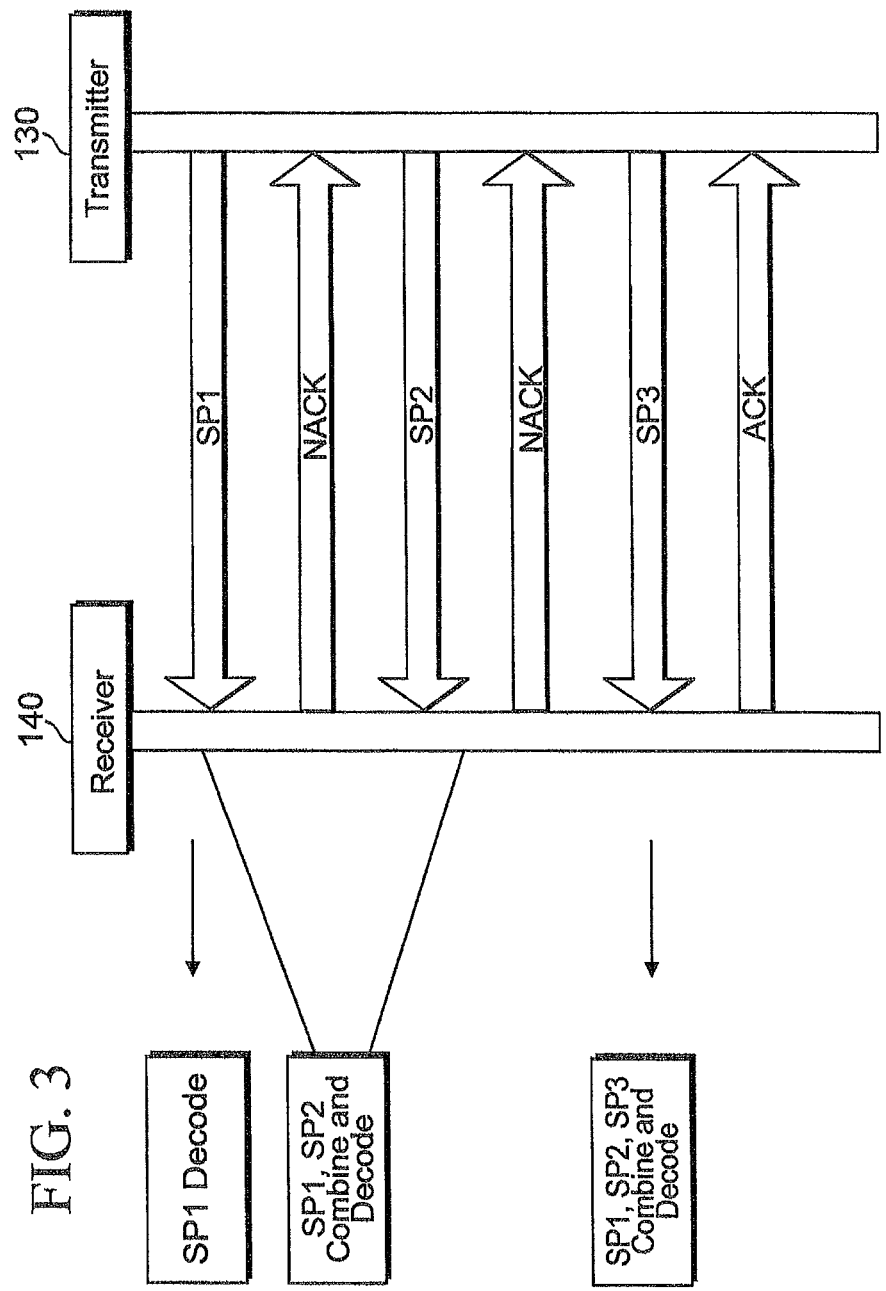
FIG. 3 schematically illustrates an example of Hybrid ARQ scheme in a wireless communication system.

An example of Hybrid ARQ protocol is shown in FIG. 3. After receiving the first subpacket SP1 from transmitter 130, receiver 140 tries to decode the received information packet.

In case of unsuccessful decoding, receiver 140 stores SP1 and sends a Negative Acknowledgement (NACK) signal to transmitter 130. After receiving the NACK signal, transmitter 130 transmits the second subpacket SP2. After receiving the second subpacket SP2, receiver 140 combines SP2 with the previously received subpacket SP1, and tries to jointly decode the combined information packet. At any point, if the information packet is successfully decoded by indication of a successful Cyclic Redundancy Check (CRC) check, for example, receiver 140 sends an ACK signal to transmitter 130. In the example of FIG. 3, the information packet is successfully decoded after receiving and combining three subpackets, SP1, SP2 and SP3. The ARQ protocol shown in FIG. 3 is generally referred to as stop-and-wait protocol because the transmitter waits for the ACK/NACK signal before sending the next subpacket. After receiving the ACK signal, the transmitter can move on to transmit a new information packet to the same or a different user.

An example of N-channel stop-and-wait (SAW) synchronous Hybrid ARQ (HARQ) protocol is shown in FIG. 4. In the example of FIG. 4, N is assumed to equal to 4. In case of a synchronous HARQ protocol, the retransmissions happen at fixed time intervals. With N=4, if the first subpacket is transmitted in time slot 1, the retransmissions of the first subpacket can only happen in slots 5, 9 and 13. The number of processes is determined by the time required for ACK/NACK feedback. When the transmitter is waiting for feedback on one HARQ process, the transmitter can transmit another data packet, such as a second subpacket. In case of N-channel stop-and-wait (SAW), N parallel information packets can be transmitted via N SAW channels, with each of the N SAW channels carrying one packet. One of the benefits of the synchronous HARQ protocol is that the control information only needs to be transmitted along with the first subpacket transmission because the timing of the retransmissions is predetermined. The drawback of synchronous HARQ, however, is that the retransmission subpackets cannot be scheduled at preferable channel conditions because the timing of the retransmission is predetermined. Also, the modulation, coding and resource format cannot be adapted at the time of retransmission according to the prevailing channel conditions at the time of retransmission.

An example of N-channel stop-and-wait (SAW) asynchronous Hybrid ARQ (HARQ) protocol is shown in FIG. 5. In case of asynchronous HARQ, the retransmission timing, modulation, coding and resource format can be adapted according to the prevailing channel and resource conditions at the time of retransmission. The control information, however, needs to be sent along with all the subpackets as shown in FIG. 5. The control information transmission along with each subpacket allows adjusting the transmission timing, modulation, coding and resources allocated.

Figure 6:
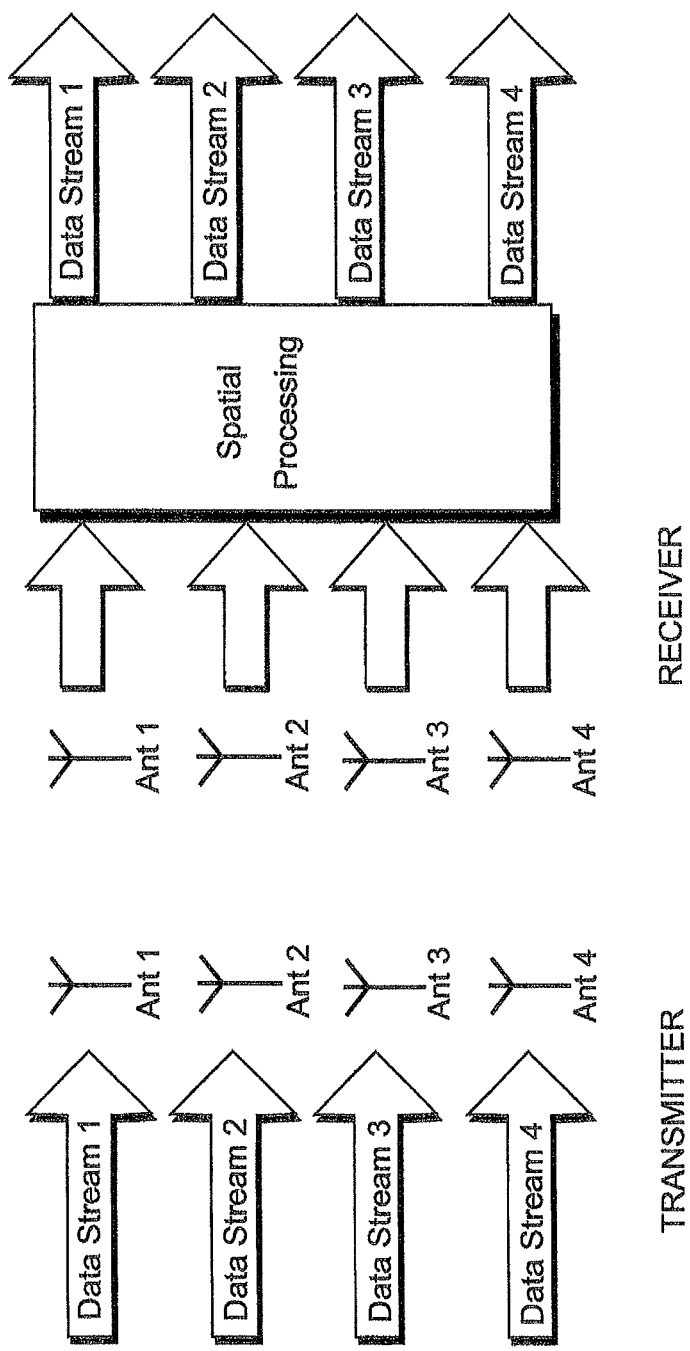
FIG. 6 schematically illustrates a Multiple Input Multiple Output (MIMO) transceiver chain.

Multiple Input Multiple Output (MIMO) schemes use multiple transmission antennas and multiple receive antennas to improve the capacity and reliability of a wireless communication channel. A MIMO system promises linear increase in capacity with K where K is the minimum of number of transmit (M) and receive antennas (N), i.e. K=min(M,N). A simplified example of a 4×4 MIMO system is shown in FIG. 6. In this example, four different data streams are transmitted separately from four transmission antennas. The transmitted signals are received at four receive antennas. Some form of spatial signal processing is performed on ii the received signals in order to recover the four data streams. An example of spatial signal processing is vertical Bell Laboratories Layered Space-Time (V-BLAST) which uses the successive interference cancellation principle to recover the transmitted data streams. Other variants of MIMO schemes include schemes that perform some kind of space-time coding across the transmission antennas (e.g., diagonal Bell Laboratories Layered Space-Time (D-BLAST)) and also beamforming schemes such as Spatial Division multiple Access (SDMA).

Figure 7:
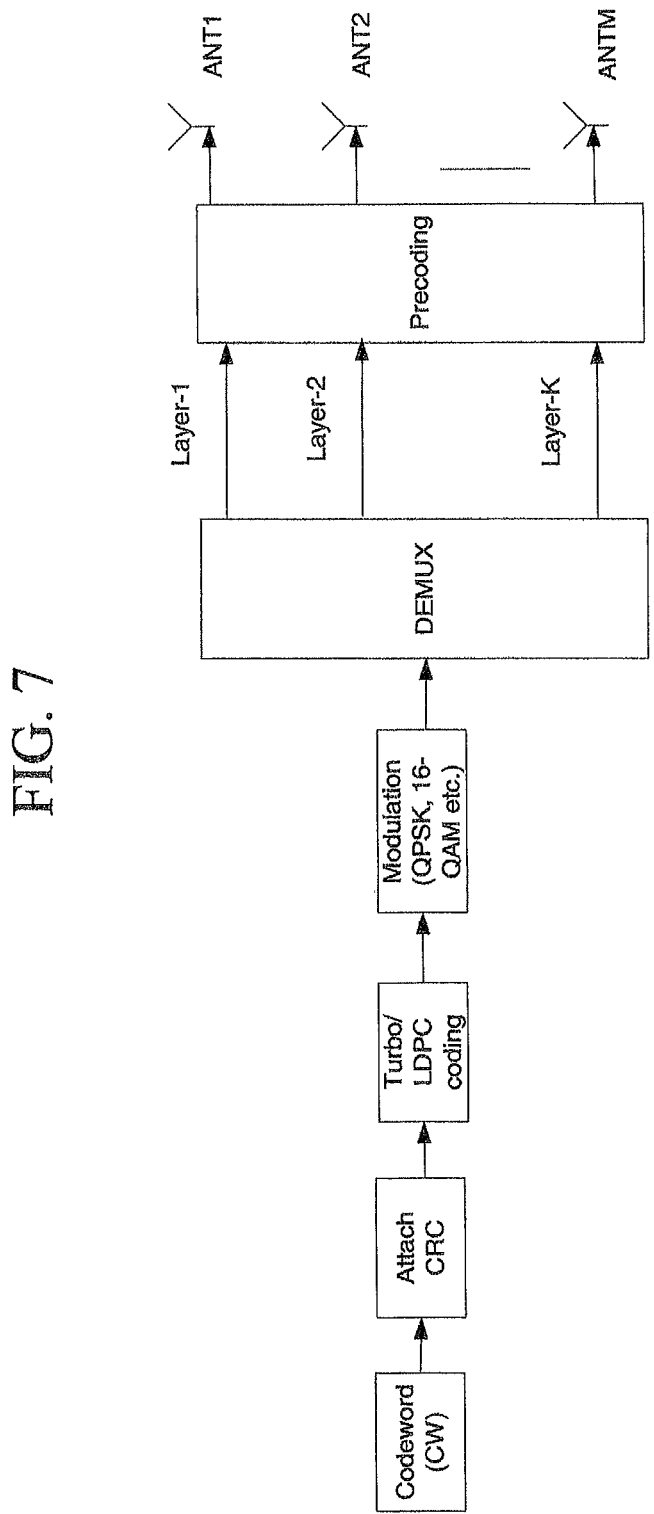
FIG. 7 schematically illustrates a Single-code word MIMO scheme.

An example of single-code word MIMO scheme is given in FIG. 7. In case of single-code word MIMO transmission, a cyclic redundancy check (CRC) is added to a single information block and then coding, for example, using turbo codes and low-density parity check (LDPC) code, and modulation, for example, by quadrature phase-shift keying (QPSK) modulation scheme, are performed. The coded and modulated symbols are then demultiplexed for transmission over multiple antennas.

Figure 8:
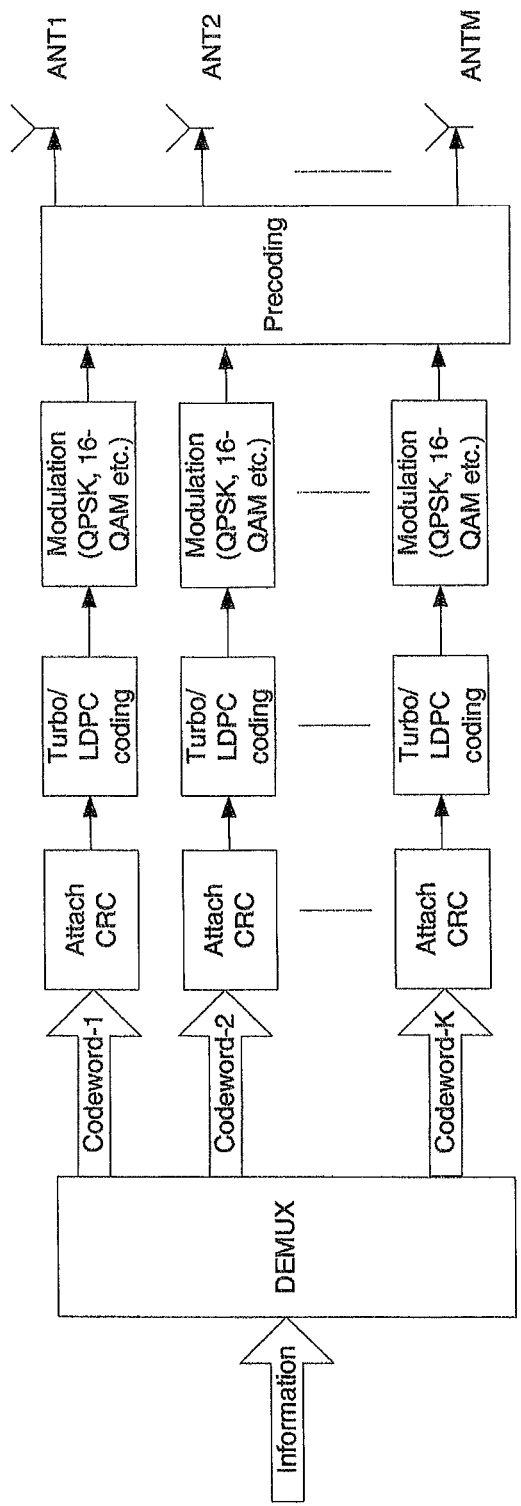
FIG. 8 schematically illustrates a Multi-code word MIMO scheme.

In case of multiple codeword MIMO transmission, shown in FIG. 8, the information block is de-multiplexed into smaller information blocks. Individual CRCs are attached to these smaller information blocks and then separate coding and modulation is performed on these smaller blocks. After modulation, these smaller blocks are respectively demultiplexed into even smaller blocks and then transmitted through corresponding antennas. It should be noted that in case of multi-code word MIMO transmissions, different modulation and coding can be used on each of the individual streams, and thus resulting in a so-called Per Antenna Rate Control (PARC) scheme. Also, multi-code word transmission allows for more efficient post-decoding interference cancellation because a CRC check can be performed on each of the code words before the code word is cancelled from the overall signal. In this way, only correctly received code words are cancelled, and thus avoiding any interference propagation in the cancellation process.

Figure 9:
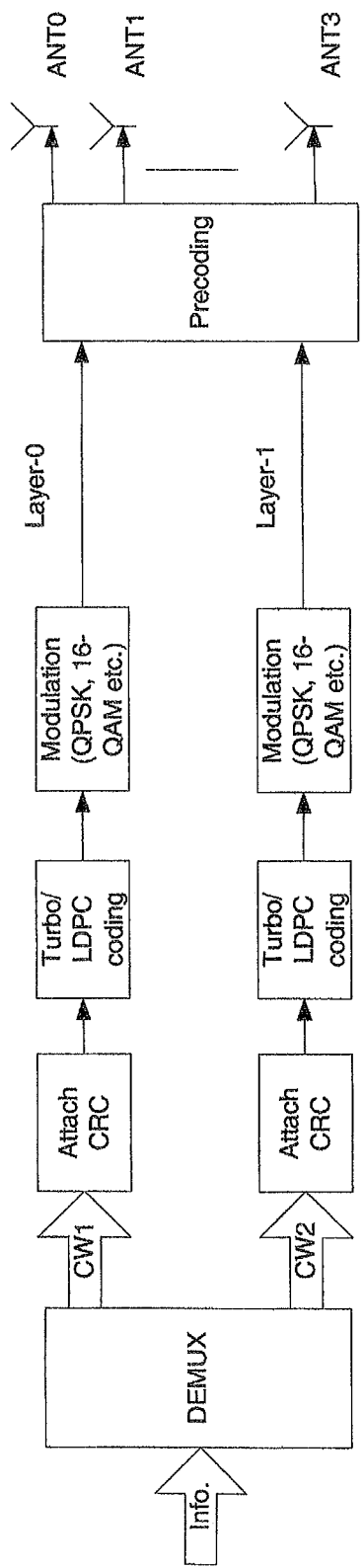
FIG. 9 schematically illustrates Multi-code word MIMO scheme for 2-layers transmission in the 3GPP LTE system.
Figure 10:
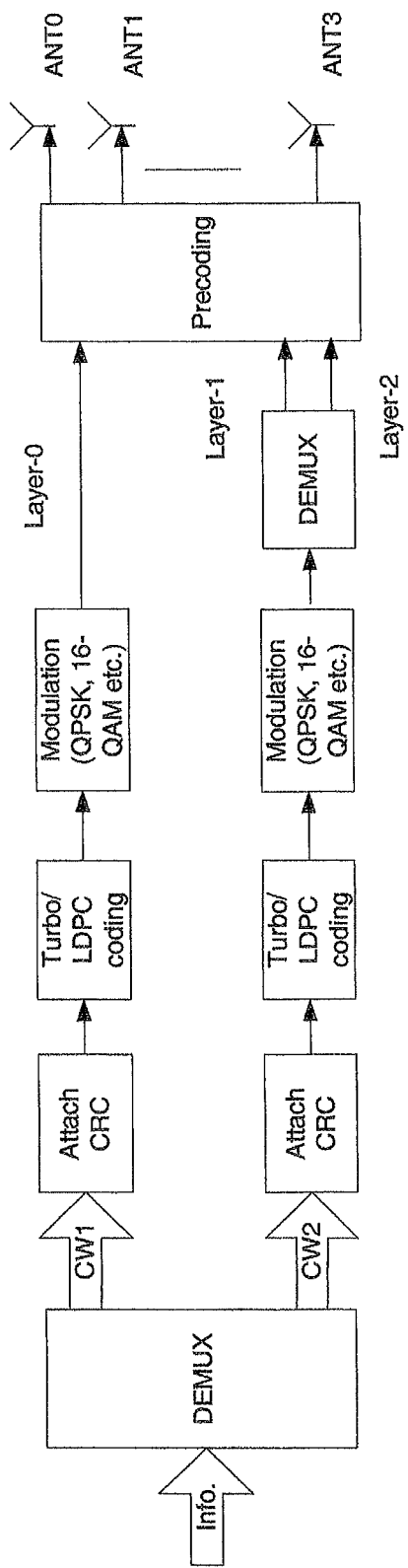
FIG. 10 schematically illustrates Multi-code word MIMO scheme for 3-layers transmission in the 3GPP LTE system.
Figure 11:
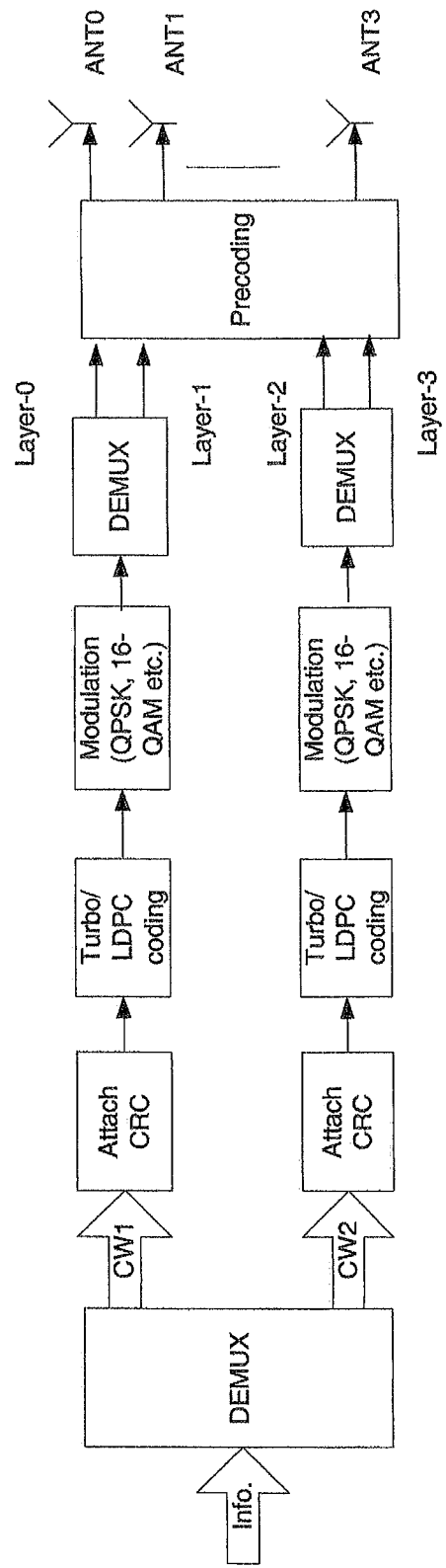
FIG. 11 schematically illustrates Multi-code word MIMO scheme for 4-layers transmission in the 3GPP LTE system.

In the third Generation Partnership Project (3GPP) Long Term Evolution (LTE) systems, a maximum of two codewords are used for transmission of two, three or four MIMO layers. As shown in FIG. 9, for rank-2 or two layers transmission, codeword-1 (CW1) is transmitted from Layer-0 while CW2 is transmitted from Layer-1. For rank-3 or three layers transmission as shown in FIG. 10, codeword-1 (CW1) is transmitted from Layer-0 while CW2 is transmitted from Layer-1 and Layer-2. For rank-4 or four layers transmission as shown in FIG. 11, codeword-1 (CW1) is transmitted from Layer-0 and Layer-1 while CW2 is transmitted from Layer-2 and Layer-3.

In the 3GPP LTE system, a 3-bit HARQ process identity (ID) is used. The process ID refers to the ID of the channel in the N-channel stop-and-wait HARQ. The 3-bit process ID allows simultaneous operation on eight SAW channels. In the example of FIG. 12, the initial subpacket SP1 is transmitted in subframe#0 on process with process ID 0 (PID=0). The retransmissions SP2 and SP3 are performed in subframe#7 and subnframe#15. With 8 HARQ processes, the minimum time between retransmissions is 8 subframes.

An example of subpackets from two codewords is shown in FIG. 13. We assume that each codeword consists of four subpackets. The subpackets are referred as redundancy versions (RV) in the context of circular buffer rate matching used in the 3GPP LTE system. The subpackets or RVs are transmitted in response to ACK/NACK feedback from the receiver.

An example of HARQ retransmission of the two codewords shown in FIG. 13 when rank changes from 2 to 1 at time of retransmissions is shown in FIG. 14. We assume that the transmission of the subpackets from both codewords fails on first attempt. As the rank changes to 1 at time of subpacket retransmission, only a single codeword can be retransmitted in rank-1. This is because both subpackets used the same process number that is process ID 0 (PID=0) and a single subpacket under a single PID can be retransmitted in rank-1. The second codeword transmission has to start from the beginning by transmission of subpacket SP21 at a later time. This results in loss of the previously transmitted subpacket SP21 in rank-2.

The possible Hybrid ARQ feedback message formats are listed in Table 1.

TABLE 1

Hybrid ARQ ACK/NACK feedback

| HARQ Feedback | CW1 | CW2 |
|---|---|---|
| ACK(0) | Negatively acknowledged | NA |
| ACK(1) | Positively acknowledged | NA |
| ACK(0, 0) | Negatively acknowledged | Negatively acknowledged |
| ACK(0, 1) | Negatively acknowledged | Positively acknowledged |
| ACK(1, 0) | Positively acknowledged | Negatively acknowledged |
| ACK(1, 1) | Positively acknowledged | Positively acknowledged |

Figure 15:
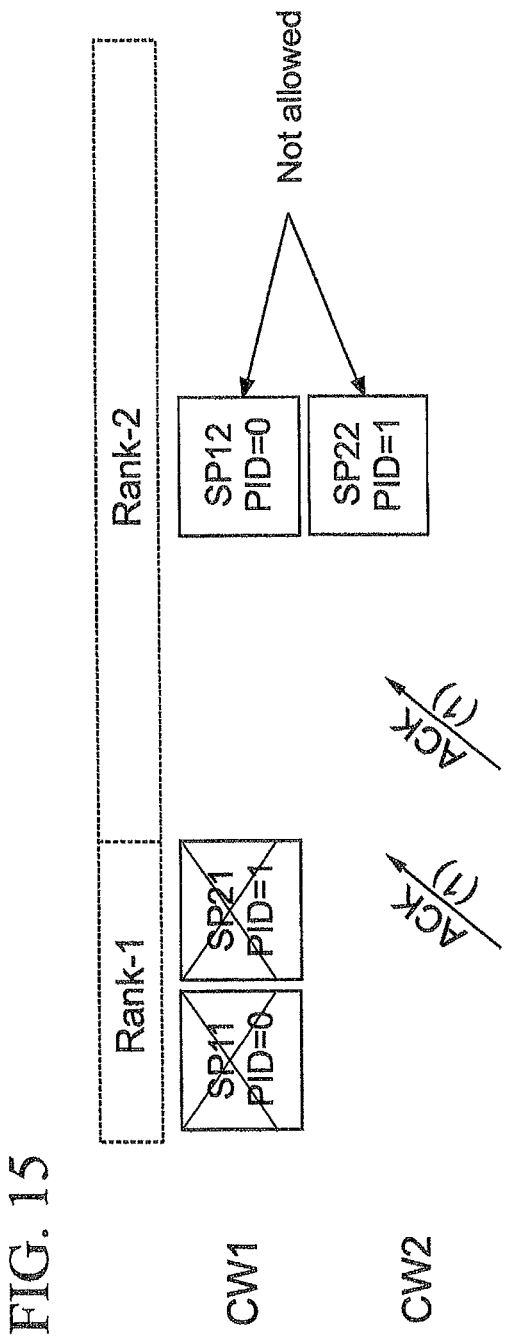
FIG. 15 schematically illustrates an example of HARQ retransmission when rank changes from 1 to 2 at time of retransmissions FIG. 16 schematically illustrates an example of HARQ retransmissions for the case when rank changes from 2 to 1 at time of retransmissions as a first embodiment according to the principles of the present invention.

An example of HARQ retransmission when rank changes from 1 to 2 at time of retransmissions is shown in FIG. 15. Two codewords are transmitted in rank-1 in two subframes because a single codeword can be transmitted in rank-1 in a given subframe. We assume that both the codewords requires retransmission. We further assume that the MIMO rank changes to a rank greater than 1 enabling transmission of two codewords. We note that the retransmissions for the two codewords cannot be performed in rank-2 because the two codewords neet to be transmitted on different hybrid ARQ processes.

In the current invention, we disclose a scheme that allows scheduling retransmissions when rank changes at the time of retransmissions.

Figure 16:
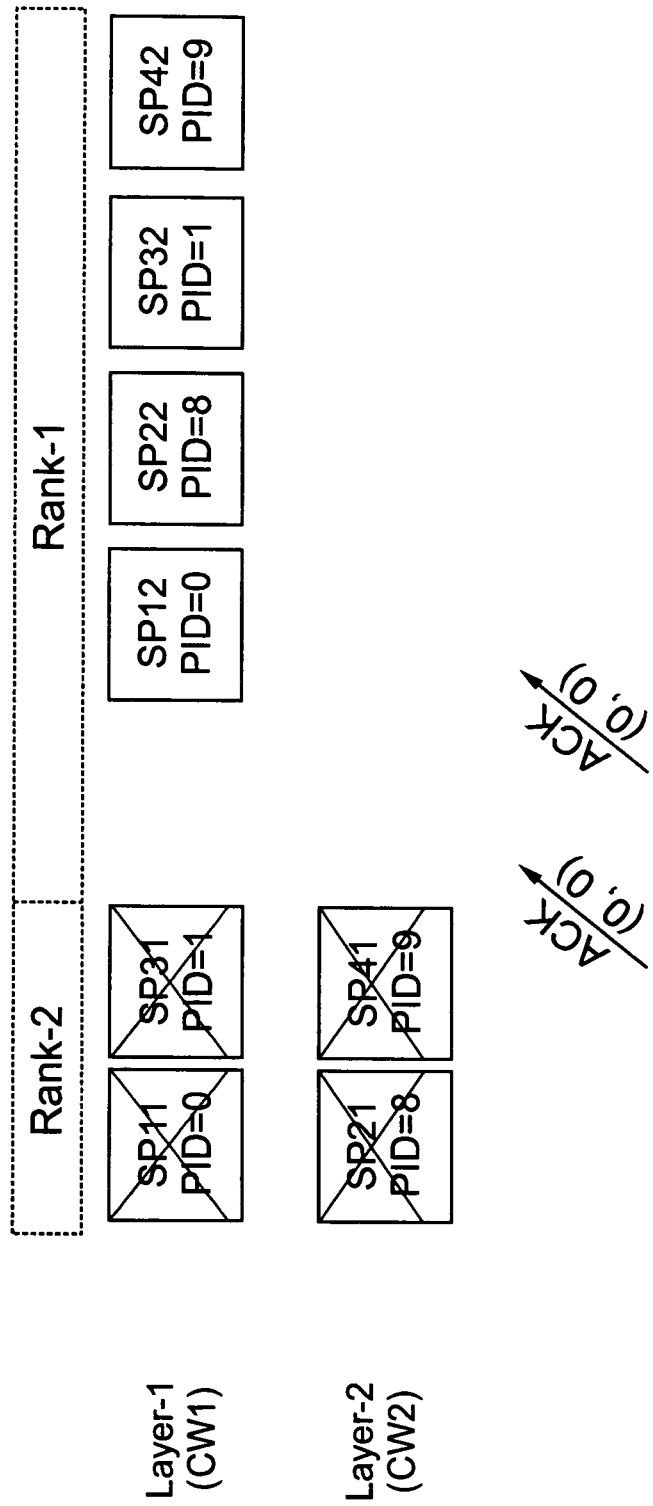

In a first embodiment according to the principles of the current invention, in a rank-2 transmission, the process ID of the second CW is linked to the process ID of the first codeword. This requires indication of only CW1 PID in the control message during the rank-2 transmission while PID for CW2 is derived from CW1 as shown in Table 2. This scheme allows for HARQ retransmissions when the MIMO rank changes from 2 to 1 as shown in FIG. 16. As shown in FIG. 16, the first transmission is a rank-2 transmission. In the first transmission, the PID1 for CW1 is explicitly transmitted, while the PID2 for CW2 is derived from the PID1 based on Table 2. In the second transmission (retransmission), the rank changed from rank-2 to rank-1. In this rank-1 transmission, there is no link between PID1 for CW1 and PID2 for CW2, and therefore both of the PID1 and PID2 are explicitly transmitted in rank-1. Table 2 is only for rank-2 transmission, instead of rank-1 transmission. Note the number of available process indications in rank-1 is sixteen (16), while the number of available process indications in rank-2 is eight (8). This HARQ retransmission requires that, however, the PID field in rank-1 is 1-bit longer than the PID field in-rank-2. For example, if 3-bits PID representing CW1 PIDs from 0 to 7 (with CW2 PIDs 8-15 implicitly derived) is used in rank-2, then a 4-bit PID representing PIDs from 0-15 is required in rank1.

In the example of FIG. 16, subpackets from four codewords are transmitted in two subframes with rank-2 (allows two simultaneous codeword transmission). Note that in FIG. 16, the linking scheme between PID3 for CW3 and PID4 for CW4 is the same as the linking scheme between PID1 and PID2. We assume that all the four codewords are negatively acknowledged and requires HARQ retransmissions. Meanwhile, the rank changes to 1 and therefore the subsequent subpackets from the four codewords are transmitted in four subframes with one subpacket transmitted in each subframe. The subpackets can be retransmitted in rank-1 with one subpacket per subframe because the number of hybrid ARQ process IDs (PIDs) is 2 times more in rank-1 than in rank-2 (16 PIDs in rank-1 versus 8 PIDs in rank-2). The principles of the current invention can be extended to the case when more than two codewords are transmitted simultaneously using multi-codeword MIMO. For example, when the number of MIMO codewords is four, a 3-bit process ID can be used for the four codewords transmission in rank-4, and the subpackets for these 4 codewords can be transmitted in rank-1 by providing 4 times more PIDs (5-bits PIDS in rank-1), because there are totally thirty-two (32) channels in the HARQ scheme for the four codewords. Similarly, when 4 codewords are transmitted in rank-2 with 2 codewords simultaneously transmitted, the PID size in rank-2 can be 4-bits. In the case of rank-2 transmission, there are two linking schemes for two pairs of codewords. For example, there is a first linking scheme between PID1 and PID2, and there is a second linking scheme between PID3 and PID4.

TABLE 2

A scheme linking CW2 PID with CW1 PID

| PID field | CW1 process ID | CW2 process ID |
|---|---|---|
| 000 | 0 | 8 |
| 001 | 1 | 9 |
| 010 | 2 | 10 |
| 011 | 3 | 11 |
| 100 | 4 | 12 |
| 101 | 5 | 13 |
| 110 | 6 | 14 |
| 111 | 7 | 15 |

In Table 2, the process ID for CW2 (PID2) is linked to the process ID for CW1 (PID1) as below:

$$PID2 = PID1 + 8 \quad (1)$$

Other functions for Hybrid ARQ PID linking between CW1 and CW2 can also be used. Another example is shown in Table 3 below where CW2 process ID (PID2) is linked to PID1 as below:

$$PID2 = 16 - PID1 \quad (2)$$

TABLE 3

A scheme linking CW2 PID with CW1 PID

| PID field | CW1 process ID | CW2 process ID |
|---|---|---|
| 000 | 0 | 15 |
| 001 | 1 | 14 |
| 010 | 2 | 13 |
| 011 | 3 | 12 |
| 100 | 4 | 11 |
| 101 | 5 | 10 |
| 110 | 6 | 9 |
| 111 | 7 | 8 |

Figure 17:
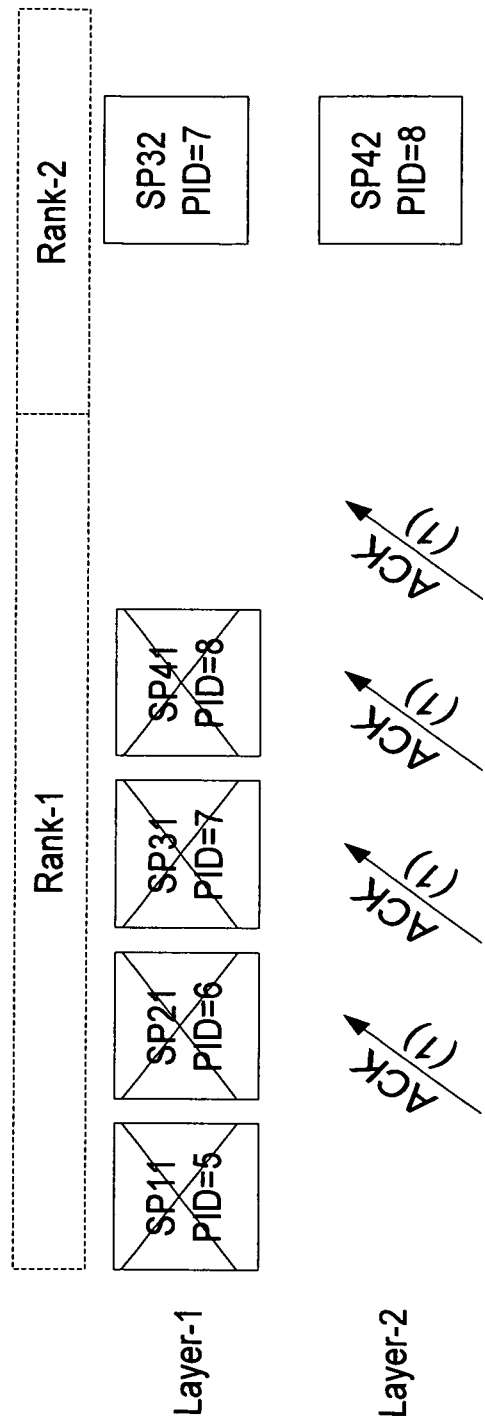
FIG. 17 schematically illustrates an example of HARQ retransmissions for the case when rank changes from 1 to 2 at time of retransmissions as a second embodiment according to the principles of the present invention.

In a second embodiment according to the principles of the present invention, an example of HARQ retransmissions according to the principles of the current invention for the case when rank changes from 1 to 2 at time of retransmissions is shown in FIG. 17. The process IDs use is assumed to be according to Table 3. We assume four subpackets from four different transport blocks (codewords) are transmitted in rank-1. At the time of retransmission when rank changes to 2, the subpackets transmitted on PID#7 and PID#8 can be scheduled together in rank-2 as allowed by the mapping in Table 3. The subpackets originally transmitted on PID#5 and PID#6 cannot, however, be scheduled together because this combination is not allowed by mapping in Table 3. Note that two process indications in the same row in Table 3 is an allowed combination.

Figure 18:
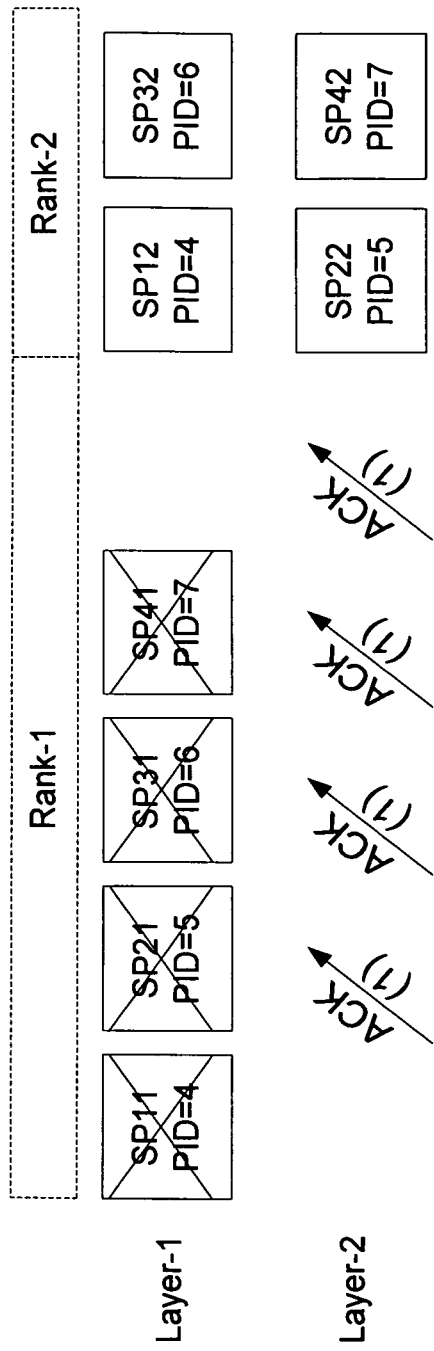
FIG. 18 schematically illustrates an example of HARQ retransmissions for the case when rank changes from 1 to 2 at time of retransmissions as a third embodiment according to the principles of the present invention.

In a third embodiment according to the principles of the present invention, the process IDs for CW1 and CW2 are derived from a single 3-bit field as in Table 4. CW1 uses odd numbers PIDs while CW2 uses even numbered PIDs. This scheme allows simultaneous scheduling of two subpackets retransmissions from rank-1 to rank-2, when the PIDs of the two subpackets are in the same row in Table 4. As shown in FIG. 18, PID1 for CW1 (SP11) is 4, and PID2 for CW2 (SP21) is 5. PID#4 and PID#5 are in the same-row in Table 4, and hence the retransmissions of the respective corresponding codewords, CW1 and CW2, can be scheduled together when the rank changes from 1 to 2. This scheme does not allow, however, retransmission of subpackets on process IDs when the process IDs are not in the same row. For example, PID#4 and PID#5 are not in the same row in Table 3, and hence subpackets on PID#4 and PID#5 cannot be retransmitted together in rank-2.

TABLE 4

CW1 and CW2 PIDs with a single 3-bit PID field

| PID field | CW1 process ID | CW2 process ID |
|---|---|---|
| 000 | 0 | 1 |
| 001 | 2 | 3 |
| 010 | 4 | 5 |
| 011 | 6 | 7 |
| 100 | 8 | 9 |
| 101 | 10 | 11 |
| 110 | 12 | 13 |
| 111 | 14 | 15 |

In a fourth embodiment according to the principles of the present invention, a full PID field and a differential process ID (DPID) field is used for two codewords transmission. An example with a 1-bit DPID field linking CW2 PID with CW1 PID is shown in Table 5. When the DPID field is set to '0', CW1 PIDs are even numbered while CW2 PIDs are odd numbered, as given by the following relationship:

$$PID2=(PID1+1)\bmod 16, \text{when } DPID='0' \quad (3)$$

When DPID field is set to '1', both CW1 and CW2 PIDs are even numbered. However, PIDs for CW2 are shifted by 2, as given by the following relationship:

$$PID2=(PID1+2)\bmod 16, \text{when } DPID='1' \quad (4)$$

This principle can be further extended by using more than 1-bit for the DPID filed. For example, with 2-bit DPID field, the CW1 and CW2 PIDs can be linked as below:

$$PID2=(PID1+1)\bmod 16, \text{when } DPID='00' \quad (5)$$

$$PID2=(PID1+5)\bmod 16, \text{when } DPID='01' \quad (6)$$

$$PID2=(PID1+9)\bmod 16, \text{when } DPID='10' \quad (7)$$

$$PID2=(PID1+13)\bmod 16, \text{when } DPID='11' \quad (8)$$

The larger the DPID field, more flexibility is allowed in hybrid ARQ retransmissions when the MIMO rank changes between original transmission and retransmissions.

TABLE 5

CW1 and CW2 PIDs linking by using a single-bit DPID

| PID field | CW1 process ID | CW2 process ID (DPID = '0') | CW2 process ID (DPID = '1') |
|---|---|---|---|
| 000 | 0 | 1 | 2 |
| 001 | 2 | 3 | 4 |
| 010 | 4 | 5 | 6 |
| 011 | 6 | 7 | 8 |
| 100 | 8 | 9 | 10 |
| 101 | 10 | 11 | 12 |
| 110 | 12 | 13 | 14 |
| 111 | 14 | 15 | 0 |

Figure 19:
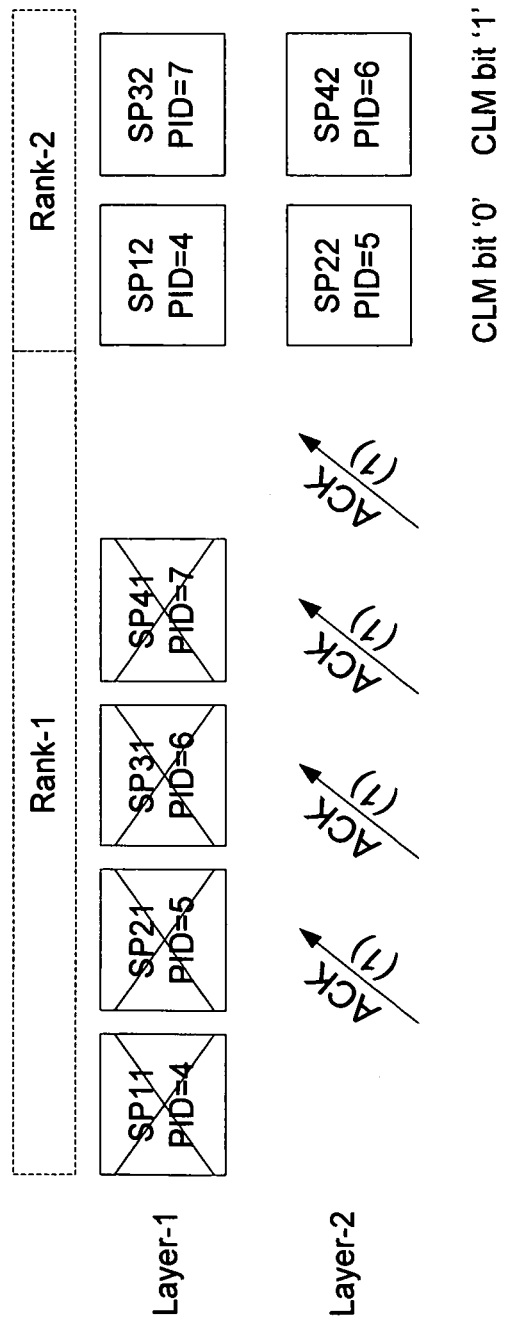
FIG. 19 schematically illustrates an example of HARQ retransmissions for the case when rank changes from 1 to 2 at time of retransmissions as another embodiment according to the principles of the present invention.

In a fifth embodiment according to the principles of the present invention, a 3-bit process ID is used for two codewords transmissions (rank-2 or greater) and a 4-bit process ID is used for one codeword transmission (rank-1). An extra codeword to layer mapping (CLM) bit, however, is used for two codewords transmission. When this bit is set, the bit flips the mapping of codewords to layers as shown in FIG. 19. When CLM bit is set to '0', PID#6 and PID#7, for example, goes on Layer-1 (CW1) and Layer-2 (CW2) respectively according to Table 4. On the other hand when the CLM bit is set to '1', PID#6 and-PID#7 goes on Layer-2 (CW2) and Layer-1 (CW1) respectively as shown in FIG. 19. In this way, the total number of bits is the same between single codeword and two codewords transmission, that is 4-bits process ID for rank-1 and 3-bits process ID+1-bit CLM indication for rank-2 and greater.

Figure 20:
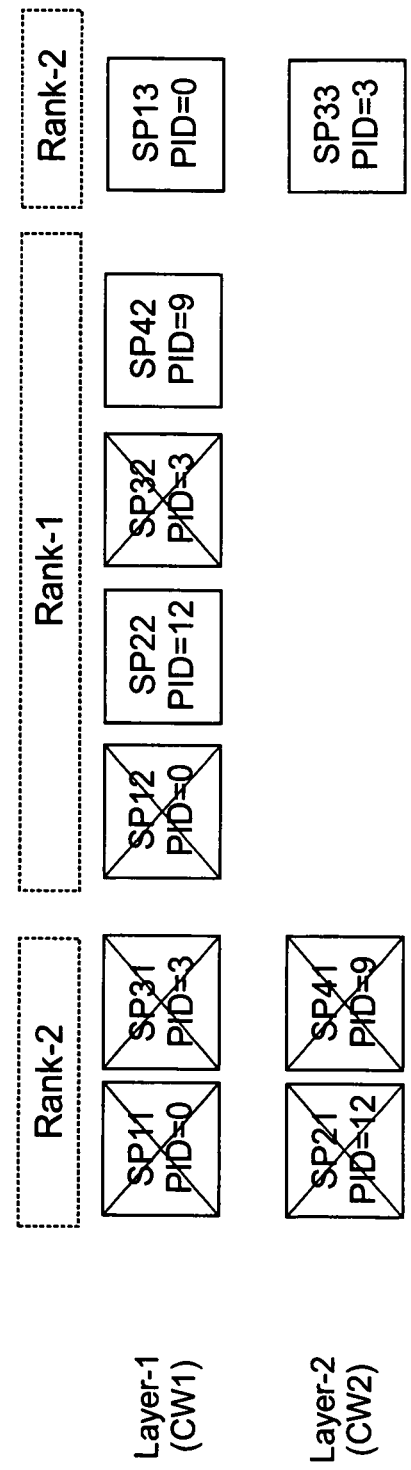
FIG. 20 schematically illustrates an example of HARQ retransmissions for the case when rank changes between rank-1 and rank-2 as still another embodiment according to the principles of the present invention.

In a sixth embodiment according to the principles of the present invention, two 4-bits process IDs (total of 8-bits) are used for two codewords transmission while a single 4-bit process ID is used for a single codeword transmission as given in Table 6. This scheme allows for full flexibility in scheduling and pairing subpackets at retransmissions when rank changes such that at sometimes only a single codeword is transmitted while at other times two codewords can be transmitted. We illustrate this flexibility by considering the example shown in FIG. 20. We assume that the four subpackets transmitted in rank-2 need retransmissions in rank-1. Since a 4-bit PID is available in rank-1, the four codewords can be transmitted in four subframes with each codewords needs its now PID. The subpacket on processes with IDs 0 and 3 fail again and are retransmitted in rank-2 again. Since each codeword has its own 4-bit process ID, the subpackets from these two codewords can be scheduled together in rank-2.

TABLE 6

CW1 and CW2 PIDs with 4-bits PID fields

| Rank-1 | Rank-2 | |
|---|---|---|
| Total bits = 4 | Total bits = 8 | |
| CW1 process IDs | CW1 process IDs | CW2 process IDs |
| 4-bits indicate PIDs from 0-15 | 4-bits indicate PIDs from 0-15 | 4-bits indicate PIDs from 0-15 |

Figure 21:
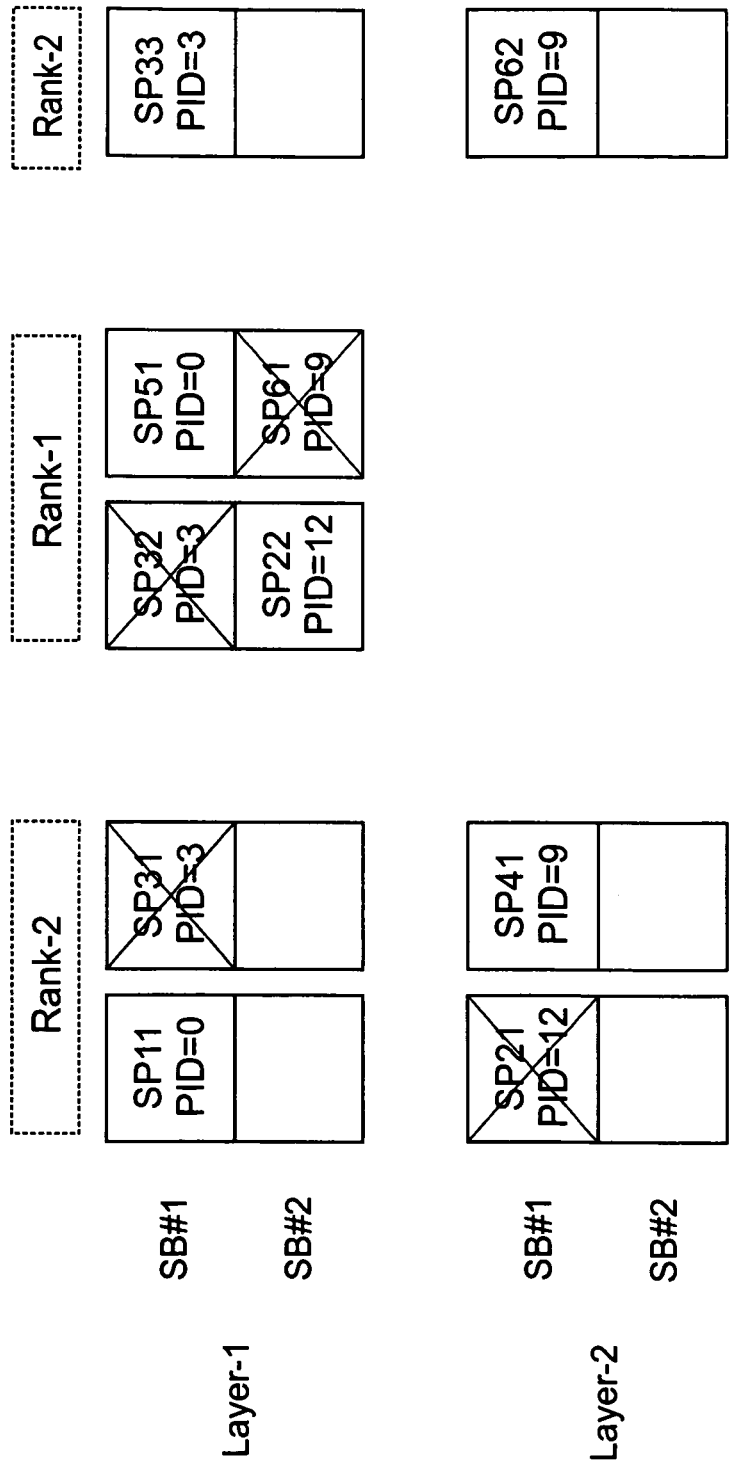
FIG. 21 schematically illustrates an example of HARQ retransmissions on different MIMO layers and different OFDM subbands when MIMO rank changes between rank-1 and rank-2 as a further embodiment according to the principles of the present invention.

In a seventh embodiment according to the principles of the present invention shown in FIG. 21, the retransmissions form the two codewords transmitted on different layers can be scheduled on different frequency subbands in OFDM. Initially four subpackets are transmitted on two layers and two subframes in rank-2. The two of the four subpackets fail and are retransmitted on a single layer in rank-1 on two OFDM subbands. A subband consists of multiple OFDM subcarriers in a single subframe. Two new subpackets, SP51 and SP61 are scheduled on two subbands on PIDs 0 and 9 respectively. The retransmission for SP32 and SP61 on PIDs 3 and 9 respectively are then retransmitted on two layers in rank-2 in a single subframe. By allowing retransmissions in frequency-domain, two subpackets can be scheduled simultaneously in a single subframe, thus speeding up the retransmissions and lowering the packet transmissions delays. It is also possible to initiate transmission of two subpackets on different subbands as is the case for subpackets SP51 and SP61 scheduled on PIDs 0 and 9 respectively. The same ACK/NACK feedback structure as for 2 codeword rank-2 transmission given in Table 1 can be used when two subpackets are scheduled on different subbands. In both cases, a 2-bit ACK/NACK for the two codewords is needed.

The above embodiments of the principles of the present invention, i.e., the methods of transmitting process indications are only application to asynchronous HARQ transmissions when rank changes between original transmission and retransmissions.

While the invention has been shown and described in connection with the preferred embodiments, it will be apparent to those skilled in the art that modifications and variations can be made without departing from the spirit and scope of the invention as defined by the appended claims.

What is claimed is:

1. An apparatus for communication in communication system, the apparatus comprising:
    a modulator configured to modulate encoded bits of at least two transport blocks to generate modulated symbols;
    a precoder configured to map the modulated symbols in each of the at least two transport blocks into corresponding layers according to transport block to layer mapping information and a swap flag; and
    a processing unit configured to transmit the modulated symbols over the mapped layers and to transmit control information related to the modulated symbols, the control information comprising modulation information, resources allocation information, a number of layers, and the swap flag.

2. The apparatus of claim 1, wherein the number of layers allows a determination, from the transport block to layer mapping information, of a mapping relationship between transport blocks and layers.

3. The apparatus of claim 2, wherein the swap flag indicates that the mapping relationship between transport blocks and layers should be swapped.

4. The apparatus of claim 1, wherein the control information further comprises a hybrid automatic repeat request (HARQ) process identity.

5. The apparatus of claim 1, wherein the control information further comprises information indicating a change of the number of layers during retransmission.

6. An apparatus for communication in a wireless network, the apparatus comprising:
    a processing unit configured to receive modulated symbols and control information, and to acquire modulation information, resources allocation information, a number of layers, and a swap flag from the control information;
    a spatial processor configured to perform spatial processing on the received modulated symbols by mapping the modulated symbols in each layer into corresponding transport blocks based on the transport block to layer mapping information and the swap flag; and
    a demodulator configured to demodulate and decode the spatial processed modulated symbols according to the modulation information.

7. The apparatus of claim 6, wherein the number of layers allows a determination, from transport block to layer mapping information, of a mapping relationship between transport blocks and layers.

8. The apparatus of claim 7, wherein the swap flag indicates that the mapping relationship between transport blocks and layers should be swapped.

9. The apparatus of claim 6, wherein the control information further comprises a hybrid automatic repeat request (HARQ) process identity.

10. The apparatus of claim 6, wherein the control information further comprises information indicating a change of the number of layers during retransmission.

11. The apparatus of claim 1, wherein the transport block to layer mapping information indicates that
    for two layers transmission, a first transport block is mapped to a first layer while a second transport block is mapped to a second layer,
    for three layers transmission, the first transport block is mapped to a first layer while the second transport block is mapped to a second layer and a third layer, and
    for four layers transmission, the first transport block is mapped to a first layer and a second layer while the second transport block is mapped to a third layer and a forth layer.

12. The apparatus of claim 11, wherein the swap flag indicates that a mapping relationship between transport blocks and layers should be swapped.

13. The apparatus of claim 6, wherein the transport block to layer mapping information indicates that
    for two layers transmission, a first transport block is mapped to a first layer while a second transport block is mapped to a second layer,
    for three layers transmission, the first transport block is mapped to a first layer while the second transport block is mapped to a second layer and a third layer, and
    for four layers transmission, the first transport block is mapped to a first layer and a second layer while the second transport block is mapped to a third layer and a forth layer.

14. The apparatus of claim 13, wherein the swap flag indicates that a mapping relationship between transport blocks and layers should be swapped.

* * * * *